United States Patent [19]

Fujihira et al.

[11] Patent Number: 5,278,965
[45] Date of Patent: Jan. 11, 1994

[54] DIRECT MEMORY ACCESS CONTROLLER

[75] Inventors: Atsushi Fujihira; Takayoshi Taniai; Harunobu Ogawa, all of Kawasaki, Japan

[73] Assignee: Fujitsu Limited, Kawasaki, Japan

[21] Appl. No.: 332,197

[22] Filed: Apr. 3, 1989

[30] Foreign Application Priority Data

Apr. 8, 1988 [JP] Japan ................................ 63-86870

[51] Int. Cl.$^5$ ................ G06F 13/00; G06F 13/28; G06F 13/32
[52] U.S. Cl. ............................. 395/425; 364/DIG. 1; 364/242.3; 364/242.31
[58] Field of Search ............... 364/200, 900, DIG.; 395/425, 250

[56] References Cited

U.S. PATENT DOCUMENTS

| | | | |
|---|---|---|---|
| 3,999,163 | 12/1976 | Levy et al. | 364/200 |
| 4,275,440 | 6/1981 | Adams, Jr. et al. | 364/DIG. 1 |
| 4,514,808 | 5/1982 | Murayama et al. | 364/200 |
| 4,611,279 | 9/1986 | Andresen et al. | 364/200 |
| 4,688,166 | 8/1987 | Schneider | 364/200 |
| 4,797,853 | 1/1989 | Savage | 364/200 |
| 4,878,166 | 10/1989 | Johnson et al. | 364/200 |
| 4,953,103 | 8/1990 | Suzuki | 364/200 |
| 4,989,113 | 1/1991 | Hull, Jr. et al. | 364/DIG. 1 |
| 5,018,098 | 5/1991 | Taniai et al. | 364/DIG. 2 |
| 5,056,011 | 10/1991 | Yoshitake et al. | 364/200 |
| 5,063,498 | 11/1991 | Hirahara et al. | 364/DIG. 1 |
| 5,119,487 | 6/1992 | Taniai et al. | 364/DIG. 1 |

FOREIGN PATENT DOCUMENTS 0009678 4/1980 European Pat. Off. .
0108415 11/1982 Fed. Rep. of Germany .
61-133460 6/1986 Japan .

OTHER PUBLICATIONS

"The Handbook of Micro Computer Interfacing" by Steve Leibson Copyright 1983 by TAB BOOKS Inc. Chapters 8 & 9 pp. 231-246.
Motorola M68000 Family Reference Book; 1988; Chapter 5.
Japanese Patent Abstract of 59-16035 filed Jan. 27, 1984.
Electronics International, vol. 56, No. 9 dated May 1983.

Primary Examiner—Alyssa H. Bowler
Attorney, Agent, or Firm—Nikaido, Marmelstein, Murray & Oram

[57] ABSTRACT

A direct memory access controller adaptable to control a direct memory access transfer in a data processing system which includes at least a central processing unit and a system bus, comprises a register coupled to the system bus for outputting a transfer terminate request signal which instructs a normal termination when the central processing unit is operating and a write operation is carried out with respect to the register from the central processing unit, and a transfer termination part coupled to the register for stopping to accept a new transfer request signal or stopping to generate a transfer request signal responsive to the transfer termination request signal so as to make an instructed channel inactive.

12 Claims, 5 Drawing Sheets

DIRECT MEMORY ACCESS CONTROLLER

BACKGROUND OF THE INVENTION

The present invention generally relates to direct memory access controllers, and more particularly to a direct memory access controller which controls a direct memory access between an input/output control unit and a memory or between two memories.

Figure 1:
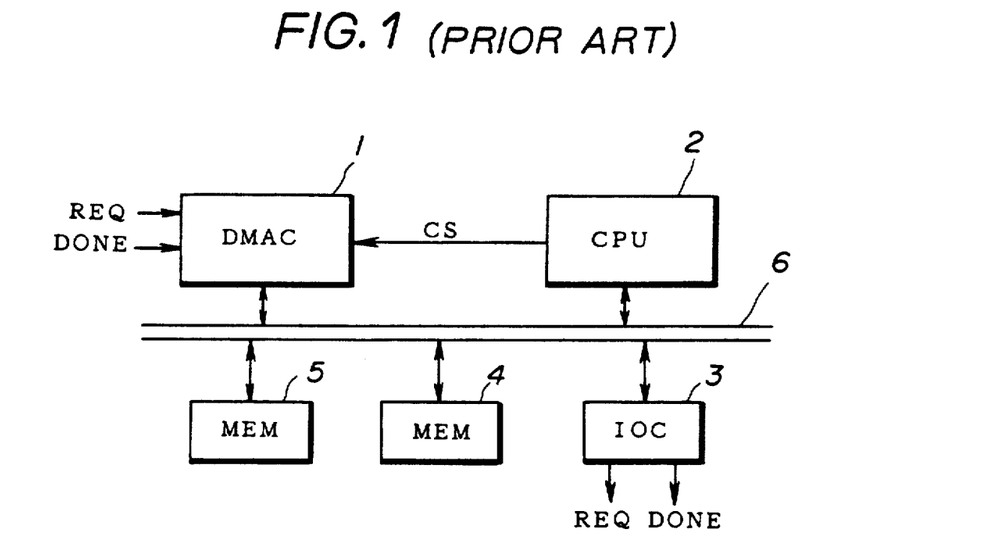
FIG. 1 is a system block diagram showing a data processing system including an example of a conventional DMAC.

FIG. 1 shows a data processing system which includes an example of a conventional direct memory access controller (hereinafter simply referred to as a DMAC). The data processing system has a DMAC 1, a central processing unit (CPU) 2, an input/output control unit 3, and memories 4 and 5 which are coupled via a system bus 6 which includes an address bus, a data bus and a control bus.

When making a desired data processing on this data processing system, a data transfer is made between the input/output control unit 3 and the memory 4 or 5 or between the memories 4 and 5. In order to improve a data transfer rate of the data transfer, a direct memory access (DMA) transfer is made between the input/output control unit 3 and the memory 4 or 5 or between the memories 4 and 5 by hardware and not through the CPU 2. This DMA transfer is controlled by the DMAC 1 so that the DMA transfer takes place during a time when the CPU 2 does not make access to the system bus 6 or by stopping the operation of the CPU 2. When making the DMA transfer, it is desirable that the DMA transfer can be terminated with an arbitrary timing.

When controlling the data transfer between the input/output control unit 3 and the memory 4 or 5 by the conventional DMAC 1, the data transfer is started responsive to a transfer request signal REQ from the input/output control unit 3 and the data transfer is terminated in a normal termination at an intermediate stage of the data transfer responsive to an interrupt request signal DONE from the input/output control unit 3. The data transfer between the memories 4 and 5 can be started responsive to a trigger signal which is continuously generated within the DMAC 1.

However, the memories 4 and 5 do not have the function of generating the interrupt request signal DONE. For this reason, once the DMAC 1 starts the DMA transfer, there is a problem in that it is impossible to terminate the DMA transfer at an intermediate stage of the data transfer in a normal termination unless an abnormality such as a bus error occurs.

On the other hand, a Japanese Laid-Open Patent Application No. 61-133460 discloses a method of interrupting the DMA transfer at an intermediate stage of the data transfer by a terminate signal which is supplied directly from the input/output control unit to the DMAC via a signal line which is provided exclusively for the terminate signal. In this case, the DMAC stops operating responsive to the terminate signal which is supplied directly to the DMAC and not through the CPU which carries out the main control of the data processing system. For this reason, the CPU may not be aware that the DMAC has stopped operating. As a result, this method introduces problems when it is necessary to make some kind of a decision or discrimination in the CPU before stopping the operation of the DMAC.

SUMMARY OF THE INVENTION

Accordingly, it is a general object of the present invention to provide a novel and useful DMAC in which the problems described above are eliminated.

Another and more specific object of the present invention is to provide a direct memory access controller adaptable to control a direct memory access transfer in a data processing system which includes at least a central processing unit and a system bus. The controller comprises register means coupled to the system bus for outputting a transfer terminate request signal which instructs a normal termination when the central processing unit is operating and a write operation is carried out with respect to the register means from the central processing unit, and transfer termination means coupled to the register means for stopping so as to accept a new transfer request signal or stopping so as to generate a transfer request signal responsive to the transfer termination request signal in order to make an instructed channel inactive. According to the direct memory access controller of the present invention, it is possible to make a normal termination during a direct memory access transfer regardless of whether or not a memory involved in the direct memory access transfer has a function of generating a normal termination request signal. Further, the normal termination can be made at an arbitrary timing.

Still another object of the present invention is to provide a direct memory access controller adaptable to control a direct memory access transfer in a data processing system which includes at least a central processing unit and mutually independent system buses, where the central processing unit being coupled to one of the mutually independent system buses the direct access controller comprises register means coupled to the mutually independent system buses for outputting a transfer terminate request signal which instructs a normal termination when the central processing unit is operating and a write operation is carried out with respect to the register means from the central processing unit, and transfer termination means coupled to the register means for stopping to accept a new transfer request signal or stopping to generate a transfer request signal responsive to the transfer termination request signal so as to make an instructed channel inactive.

A further object of the present invention is to provide a direct memory access controller adaptable to control a direct memory access transfer in a data processing system which includes at least a central processing unit and a system bus. The controller comprises a request handler for outputting a process request signal and an operation channel number in response to a transfer request signal and for outputting a process request signal instructing a normal termination in response to an interrupt request signal, a microsequencer which stores microprograms for renewing an address and a byte number required for a direct memory access and for generating a control signal based on the process request signal and the operation channel number received from the request handler, a data handler for making access to the system bus in response to the operation channel number received from the request handler and the control signal received from the microsequencer and for generating a read/write signal, and a register which is accessible by the central processing unit through the system bus, the register outputting a transfer terminate request signal which instructs a normal termination when the central processing unit is operating and a predetermined information is written in the register from the central processing unit.

Other objects and features of the present invention will be apparent from the following detailed description when read in conjunction with the accompanying drawings.

DETAILED DESCRIPTION

Figure 2:
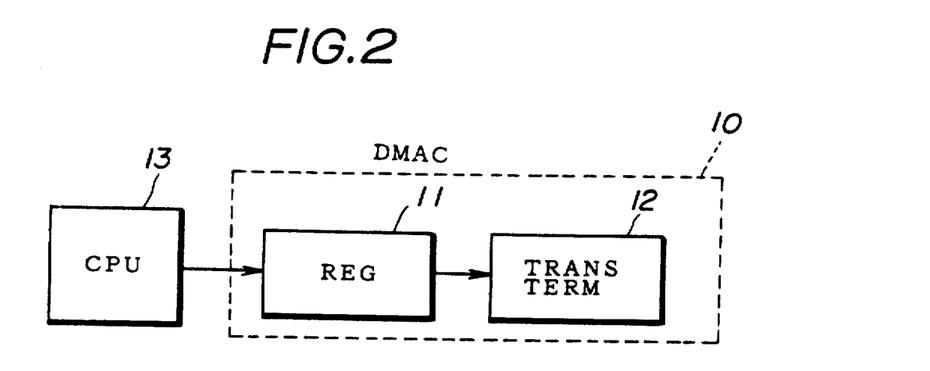
FIG. 2 is a system block diagram showing an essential part of a data processing system including a DMAC according to the present invention for explaining an operating principle thereof.

First, a description will be given of an operating principle of a DMAC according to the present invention by referring to FIG. 2. In FIG. 2, a DMAC 10 is coupled to a CPU 13, and this DMAC 10 includes a register 11 and a transfer termination means 12. The register 11 outputs a transfer terminate request signal which instructs a normal termination of a data transfer when the CPU 13 writes information requesting a termination of the data transfer in the register 11. The transfer termination means 12 stops accepting a new transfer request signal or stops generating a transfer request signal responsive to the transfer terminate request signal, and makes an instructed channel inactive.

Even when a DMA transfer is started, the transfer termination means 12 stops accepting a new transfer request signal or stops generating a transfer request signal when the CPU 13 writes the above described information in the register 11. For this reason, it is possible to terminate the DMA transfer in a normal termination at an intermediate stage of the data transfer regardless of whether or not the DMA transfer involves a memory or the like having no function of generating a normal termination request signal.

Figure 3:
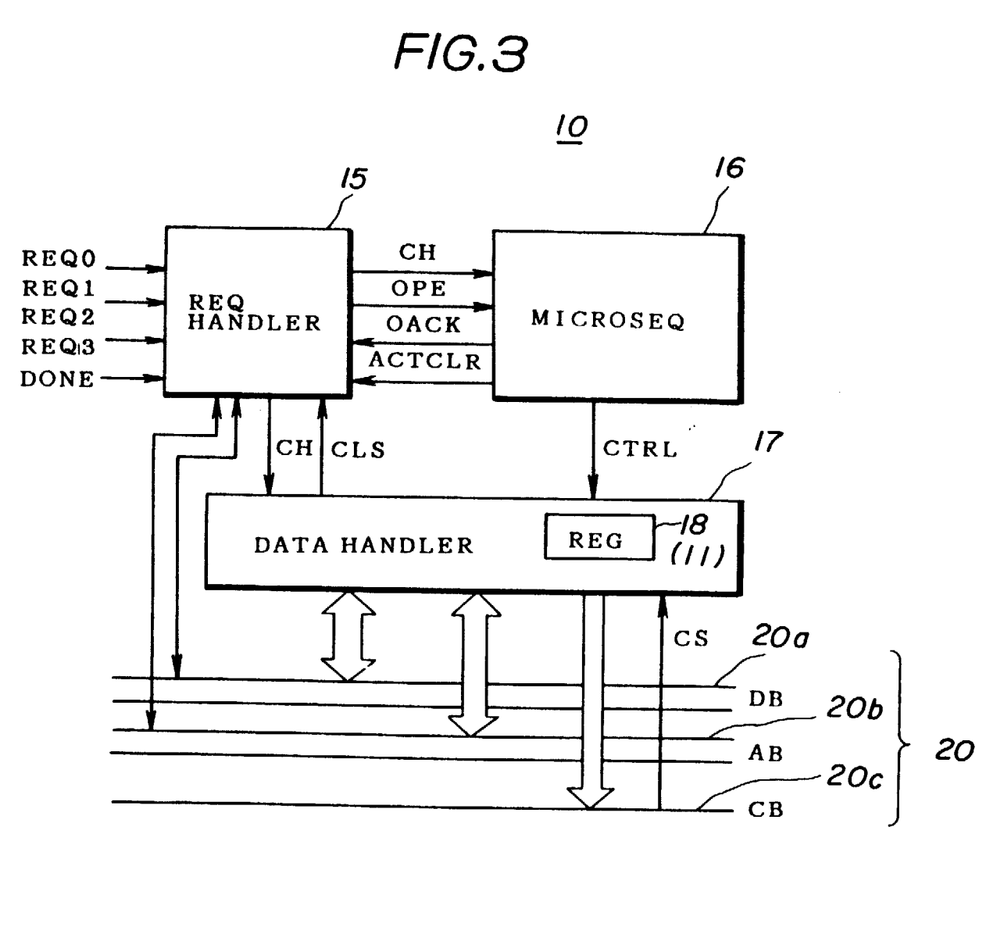
FIG. 3 is a system block diagram showing an embodiment of the DMAC according to the present invention.
Figure 6A:
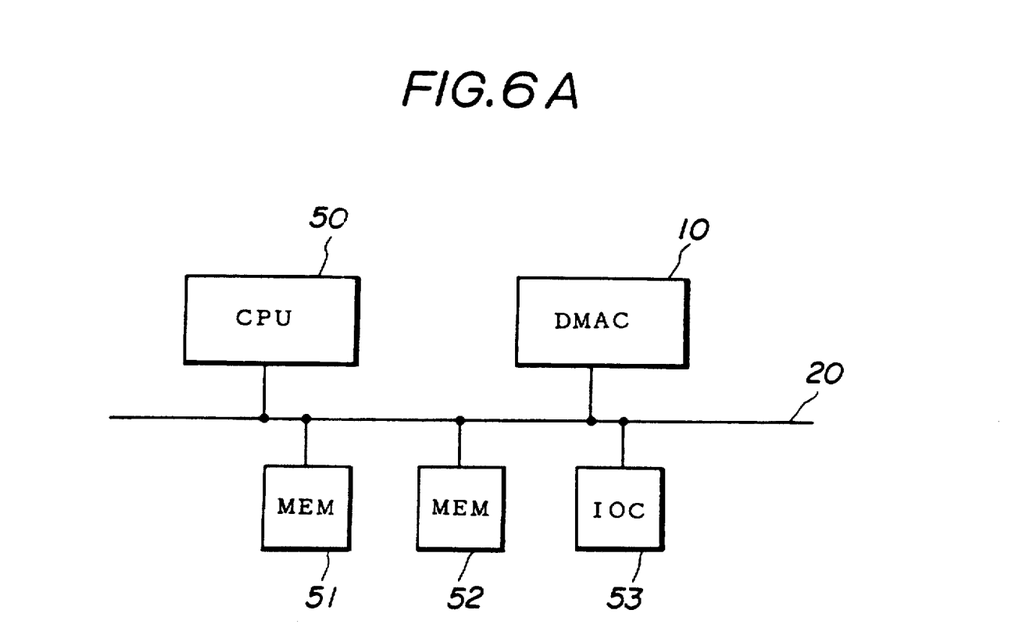
FIGS. 6A and 6B are system block diagrams respectively showing data processing systems to which the DMAC according to the present invention may be applied.

FIG. 3 shows an embodiment of the DMAC 10. The DMAC 10 has a request handler 15, a microsequencer 16, and a data handler 17. A system bus 20 has a data bus 20a, an address bus 20b, and a control bus 20c. The DMAC 10 may be applied to a data processing system shown in FIG. 6A, for example. In FIG. 6A, the data processing system includes a CPU 50, memories 51 and 52, an input/output control unit 53 and the DMAC 10 which are coupled via the system bus 20.

The request handler 15 receives transfer request signals REQ0 through REQ3 of channels "0" through "3" from the input/output control unit 53, and outputs a process request signal OPE and an operation channel number CH depending on a predetermined priority. In addition, the request handler 15 receives an interrupt request signal DONE from the input/output control unit 53 if needed, and outputs a process request signal OPE indicative of the interrupt request. Furthermore, as will be described later, the request handler 15 also outputs a process request signal OPE which instructs a normal termination responsive to a terminate request signal CLS received from the data handler 17.

The microsequencer 16 stores microprograms and and renews an address, byte number and the like required for the DMA transfer depending on the process request signal OPE and the operation channel number CH received from the request handler 15. The microsequencer 16 also outputs a control signal CTRL which is supplied to the data handler 17.

The data handler 17 has an internal register 18 which corresponds to the register 11 shown in FIG. 2. The data handler 17 makes access to the data bus 20a and the address bus 20b depending on the operation channel number CH and the control signal CTRL. At the same time, the data handler 17 outputs control signals such as a read/write signal, and these control signals are outputted on the control bus 20c. When an access is made to an internal register such as the register 18 of the data handler 17 by a chip select signal CS which is received from the CPU 50 through the control bus 20c, the data handler 17 makes a data write operation or a data read operation with respect to a selected internal register of the data handler 17. Data from the data bus 20a is written into the selected internal register of the data handler 17 by the data write operation, and a stored data is read out from the selected internal register of the data handler 17 by the data read operation.

Figure 4:
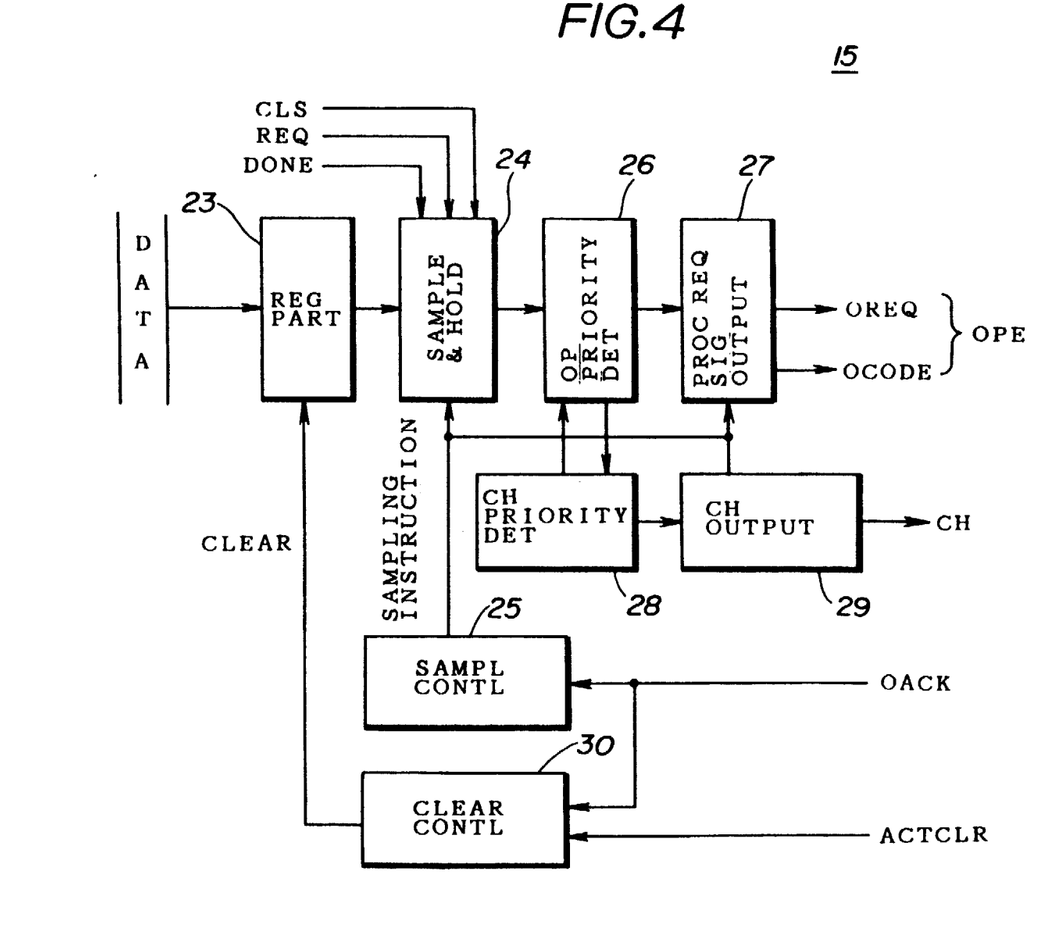
FIG. 4 is a system block diagram showing an embodiment of a request handler of the DMAC shown in FIG. 3.

The request handler 15 generates the process request signal OPE for terminating the DMA transfer, and FIG. 4 shows an embodiment of the request handler 15. The request handler 15 includes a register part 23, a sample and hold circuit 24, a sampling control circuit 25, an operation priority determination part 26, a process request signal output part 27, a channel priority determination part 28, a channel output part 29, and a clear control circuit 30.

For example, the register part 23 stores a cycle steal mode, a burst mode and a request generation information, and a sampling mode of the sample and hold circuit 24 is set depending on such information stored in the register part 23. The cycle steal mode refers to a mode where a DMA transfer is made using a time interval in which the CPU 50 does not make an access to the system bus 20. The burst mode refers to a mode where a data transfer is made by stopping the CPU 50. In this burst mode, a discrimination is made every time to determine whether or not a next request for DMA transfer exists, and the DMA transfer is made continuously when the next request for DMA transfer exists. Further, the request generation information refers to information which indicates whether an external transfer request is to be received or a transfer request is to be self-generated within the DMAC 10.

The sample and hold circuit 24 samples and holds one of the terminate request signal CLS, the transfer request signal REQ (REQ0 through REQ3) and the interrupt request signal DONE responsive to a sample instruction signal from the sampling control circuit 25, and supplies the sampled and held signal to the operation priority determination part 26.

When signals are received at the same time, the operation priority determination part 26 determines the priorities of the signals according to a predetermined sequence and supplies the priorities to the process request signal output part 27 and the channel priority determination part 28. The priorities are also supplied to the channel output part 29 through the channel priority determination part 28 and is supplied to the microsequencer 16 and the data handler 17 as the operation channel number CH.

The process request signal output part 27 supplies process request signals OREQ and OCODE to the microsequencer 16. These request signals OREQ and OCODE correspond to the process request signal OPE. The following Table shows the relationship of the value of the process request signal OCODE and the content of the process request.

TABLE

| Value of OCODE | Content of Process Request |
|---|---|
| 00 | START |
| 01 | ABORT |
| 10 | CLOSE |
| 11 | IRA |

In the Table, "START" indicates an instruction to start a DMA transfer, "ABORT" indicates an abnormal termination instruction based on an external request which is entered via a signal line other than the system bus 20, "CLOSE" indicates a normal termination instruction at an intermediate stage of the DMA transfer, and "IRA" indicates an instruction when an illegal register access is made. The illegal register access occurs when a write operation is made with respect to an internal register of the DMAC 10 in a state where the DMAC 10 is operating and no rewriting of the internal register should be made.

In FIG. 4, OACK and ACTCLR respectively denote process terminate signals received from the microsequencer 16. The process terminate signal OACK is supplied to the sampling control circuit 25 and the clear control circuit 30, while the process terminate signal ACTCLR is supplied to the clear control circuit 30. The process terminate signals OACK and ACTCLR are respectively entered when terminating the process. However, although the process terminate signal OACK is entered every time each of a plurality of processes terminate during a time in which the channel is active, the process terminate signal ACTCLR is only entered at a time when the processes as a whole terminate. The register part 23 is cleared by an output signal of the clear control circuit 30 when the processes as a whole terminate.

Figure 5:
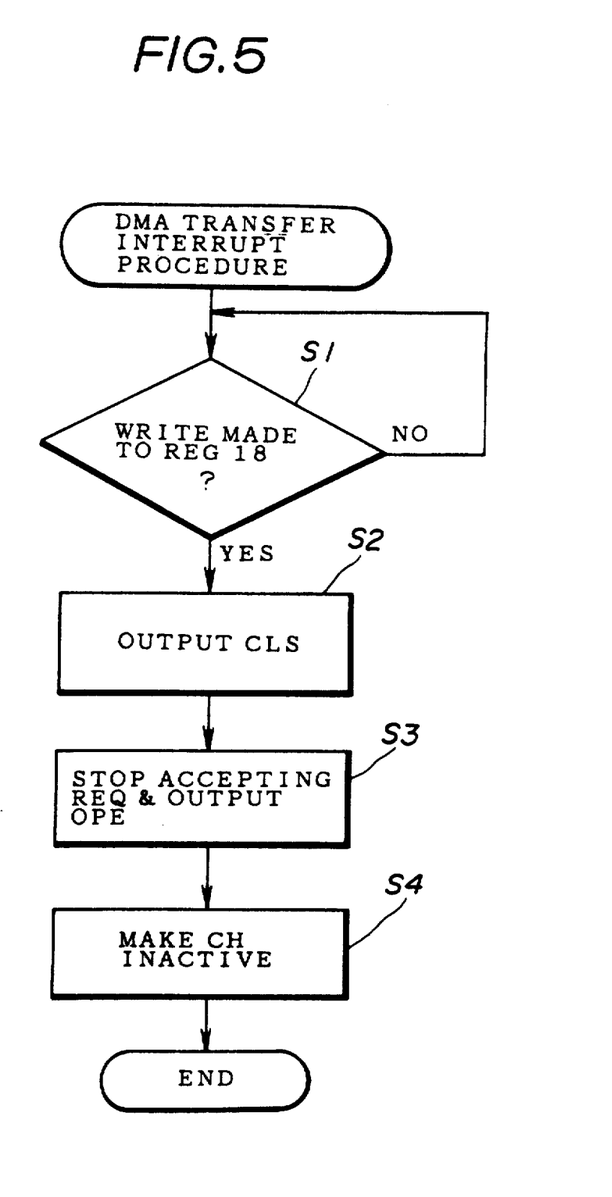
FIG. 5 is a flow chart for explaining the operation of the DMAC shown n FIG. 3.

Next, a description will be given of the operation of the embodiment shown in FIG. 3 by referring to a flow chart shown in FIG. 5 and the block system shown in FIG. 4. For the sake of convenience, it is assumed that a DMA transfer is made directly between the two memories 51 and 52 and not via the CPU 50. In this state where the DMA transfer is made, the CPU 50 outputs the chip select signal CS responsive to an external interrupt request. In a step S1, the CPU 50 discriminates whether or not a write operation is made with respect to the register 18 within the data handler 17 for instructing an interrupt request responsive to the chip select signal CS. When the discrimination result in the step S1 becomes YES, the data handler 17 in a step S2 supplies the terminate request signal CLS to the request handler 15 as described before in conjunction with FIG. 3.

Accordingly, in a step S3, the request handler 15 stops accepting the transfer request signal REQ and outputs the process request signal OPE for making a normal termination (interruption) of the process. In other words, the request handler 15 stops the operation of sampling and holding a new transfer request signal REQ in the sample and hold circuit 24 shown in FIG. 4 after the terminate request signal CLS is received, and the process request signal output part 27 outputs the normal termination instruction signal indicated as "CLOSE" in the Table described before responsive to the terminate request signal CLS.

In a step S4, the microsequencer 16 makes the instructed channel inactive. The processes of the steps S3 and S4 are realized by the transfer termination means 12 shown in FIG. 2.

Therefore, even when the data processing system has such a system structure that the memory cannot generate the interrupt request signal during the DMA transfer between two memories, it is possible to make a normal interruption of the DMA transfer as if the interrupt request signal DONE is generated, by making a write operation with respect to the register 18 from the CPU 50.

In the described embodiment, the register 18 is an internal register of the data handler 17. However, it is of course possible to provide the register 18 within the request handler 15, for example. In addition, instead of stopping the acceptance of the new transfer request signal REQ as described above, it is also possible to stop the generation of the transfer request signal REQ within the DMAC 10.

Figure 6B:
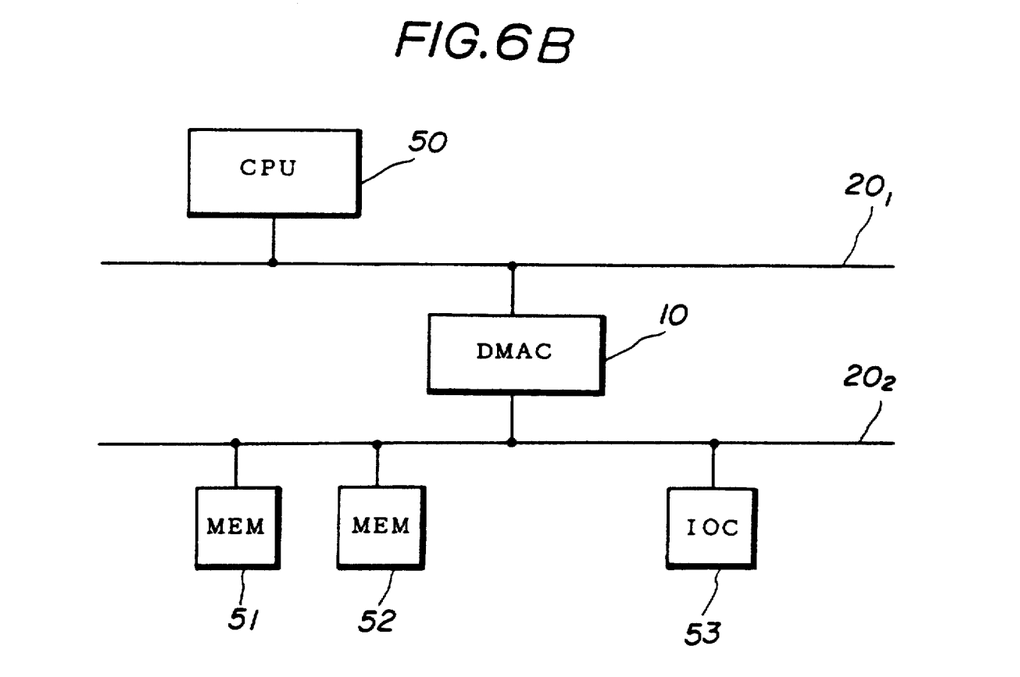

On the other hand, the DMAC 10 is also applicable to a data processing system having two mutually independent system buses as shown in FIG. 6B. In FIG. 6B, those parts which are basically the same as those corresponding parts in FIG. 6A are designated by the same reference numerals, and a description thereof will be omitted. In FIG. 6B, the CPU 50 is coupled to a system bus $20_1$, and the DMAC 10 is coupled to both system buses $20_1$ and $20_2$. The memories 51 and 52 and the input/output control unit 53 are coupled to the system bus $20_2$.

Further, the present invention is not limited to these embodiments, but various variations and modifications may be made without departing from the scope of the present invention.

What is claimed is:

1. A direct memory access controller adaptable to control a direct memory access transfer in a data processing system which includes at least a central processing unit and a data bus, said direct memory access controller comprising:

request means for generating a transfer request signal;

a microsequencer which stores microprograms for renewing an address and a byte number required for a direct memory access, and for generating a control signal based on the transfer request signal received from said request means;

a data handler for making access to the data bus in response to said request means generating the transfer request signal and to the control signal received from said microsequencer, and for generating a read/write signal to the data bus;

register means operatively coupled to the data bus, for storing control information so as to generate a transfer terminate request signal which instructs a normal termination of a direct memory access transfer, the control information being written into said register means by the central processing unit via the data bus at an intermediate stage of the direct memory access transfer; and transfer information means operatively coupled to said register means, for terminating the direct memory access transfer in response to the transfer terminate request signal even if the direct memory access transfer is in the intermediate stage, wherein said transfer information means inhibits said request means from generating the transfer request signal.

2. The direct memory access controller as claimed in claim 1, wherein said transfer information means is further for stopping said request means from generating any further transfer request signal.

3. A direct memory access controller adaptable to control a direct memory access transfer in a data processing system which includes at least a central processing unit and mutually independent data buses, said central processing unit being coupled to one of the mutually independent data buses, said direct memory access controller comprising:

request means for generating a transfer request signal;

a microsequencer which stores microprograms for renewing an address and a byte number required for a direct memory access, and for generating a control signal based on the transfer request signal received from said request means;

a data handler for making access to the mutually independent data buses in response to said request means generating the transfer request signal and to the control signal received from said microsequencer, and for generating an read/write signal to the mutually independent data buses;

register means operatively coupled to the mutually independent data buses, for storing control information so as to generate a transfer terminate request signal which instructs a normal termination of a direct memory access transfer, the control information being written into said register means by the central processing unit via the data bus at an intermediate stage of the direct memory access transfer; and transfer information means operatively coupled to said register means, for terminating the direct memory access transfer in response to the transfer terminate request signal even if the direct memory access transfer is in the intermediate stage.

4. The direct memory access controller as claimed in claim 3, wherein said transfer information means is further for stopping said request means from generating any further transfer request signal.

5. A direct memory access controller adaptable to control a direct memory access transfer in a data processing system which includes at least a memory, a central processing unit and a data bus, said direct memory access controller comprising:

a request handler for outputting a process request signal and an operation channel number in response to a transfer request signal;

a microsequencer which stores microprograms for renewing an address and a byte number required for a direct memory access, and for generating a control signal based on the process request signal and the operation channel number received from said request handler;

a data handler for making access to the data bus in response to the operation channel number received from said request handler and the control signal received from said microsequencer and for generating a read/write signal to the data bus; and a register means which is accessible by the central processing unit through the data bus, said register means for outputting a transfer terminate request signal which instructs a normal termination of the direct memory access transfer at an intermediate stage of the direct memory access transfer and for outputting the transfer terminate request signal so as to terminate output of the process request signal.

6. The direct memory access controller as claimed in claim 5 wherein said data handler is connected to the central processing unit through the data bus so as to receive a chip select signal from the central processing unit when the central processing unit accesses said register means.

7. The direct memory access controller as claimed in claim 5 wherein said data handler is connected to said request handler so as to output a termination request signal to said request handler when the predetermined information is written in said register means, said request handler outputting a process request signal to said microsequencer and stopping receiving new transfer request signals in response to receiving the termination request signal.

8. The direct memory access controller as claimed in claim 5 wherein said microsequencer makes an instructed channel inactive in response to the process request signal and to the operation channel number outputted from said request handler which are generated responsive to the transfer terminate request signal.

9. The direct memory access controller as claimed in claim 5 wherein said register means is provided within said data handler.

10. The direct memory access controller as claimed in claim 9 wherein said data handler is connected to the central processing unit through the data bus so as to receive a chip select signal from the central processing unit when the central processing unit accesses said register means.

11. The direct memory access controller as claimed in claim 9 wherein said data handler is connected to said request handler so as to output a termination request signal to said request handler when the predetermined information is written in said register, said request handler outputting a process request signal to said microsequencer and stopping receiving new transfer request signals in response to receiving the termination request signal.

12. The direct memory access controller as claimed in claim 9 wherein said microsequencer makes an instructed channel inactive in response to the process request signal and to the operation channel number outputted from said request handler which are generated responsive to the transfer terminate request signal.

* * * * *

UNITED STATES PATENT AND TRADEMARK OFFICE
CERTIFICATE OF CORRECTION

PATENT NO.    :    5,278,965
DATED         :    January 11, 1994
INVENTOR(S)   :    Atsushi FUJIHIRA et al It is certified that error appears in the above-identified patent and that said Letters Patent is hereby corrected as shown below:

On the title page, Item [57], delete the entire Abstract and replace with the following:

A direct memory access controller adaptable to control a direct memory access transfer in a data processing system which includes at least a central processing unit and a data bus, incorporates a register coupled to the data bus for storing control information for generating a transfer terminate request signal which instructs a normal termination of a direct memory access transfer, and a transfer information part coupled to the register for terminating the direct memory access transfer in response to the transfer terminate request signal even if in the intermediate stage.

Signed and Sealed this

Twenty-second Day of November, 1994

*Attest:*

BRUCE LEHMAN

*Attesting Officer*      *Commissioner of Patents and Trademarks*